（12）United States Patent
Anderson et al.

(10) Patent No.: US 8,377,581 B2
(45) Date of Patent: Feb. 19, 2013

(54) BATTERY PACK FOR A VEHICLE

(75) Inventors: Alastair Gordon Anderson, Wiesbaden (DE); Marc Reischmann, Wallertheim (DE); Manfred Herrmann, Ginsheim-Gustavsburg (DE); Erik Heil, Trebur (DE); Michael Kueffe, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 959 days.

(21) Appl. No.: 12/413,223

(22) Filed: Mar. 27, 2009

(65) Prior Publication Data
US 2010/0243346 A1  Sep. 30, 2010

(51) Int. Cl.
*H01M 10/50* (2006.01)
(52) U.S. Cl. .......... 429/120; 429/149; 429/156; 429/62
(58) Field of Classification Search .............. 429/62, 429/120, 149; 136/204
See application file for complete search history.

(56) References Cited

U.S. PATENT DOCUMENTS

| 5,176,000 A | * | 1/1993 | Dauksis | 60/618 |
| 5,987,892 A | * | 11/1999 | Watanabe et al. | 62/3.7 |
| 6,226,994 B1 | * | 5/2001 | Yamada et al. | 62/3.7 |
| 2008/0311466 A1 | * | 12/2008 | Yang et al. | 429/62 |

FOREIGN PATENT DOCUMENTS

| JP | 08148189 A | * | 6/1996 |
| WO | 2008123663 A1 | | 10/2008 |

* cited by examiner

*Primary Examiner* — Basia Ridley
*Assistant Examiner* — Heng Chan
(74) *Attorney, Agent, or Firm* — Ingrassia Fisher & Lorenz, P.C.

(57) ABSTRACT

A battery system is provided for a vehicle. The battery system includes, but is not limited to, comprising: a heat transfer loop, a battery cell, a thermoelectric semiconductor device coupled to the battery cell and the heat transfer loop, a variable voltage source coupled to the thermoelectric semiconductor device, and a temperature sensor coupled to the battery cell. A controller is coupled to the variable voltage source and the temperature sensor and also configured to receive a signal indicative of a temperature of the battery cell from the temperature sensor and adjust a voltage of the variable voltage source applied to the thermoelectric semiconductor device based at least in part on an evaluation of the temperature.

19 Claims, 2 Drawing Sheets

BATTERY PACK FOR A VEHICLE

TECHNICAL FIELD

The technical field generally relates to a battery pack, and more particularly relates to a battery pack for a vehicle, such as an automobile.

BACKGROUND

Vehicles, such as automobiles, utilize one or more batteries as a power source for numerous systems of the vehicle. One example of a vehicle system that utilizes battery power is the drive system. There are vehicle drive systems that solely use a motor powered by electricity drawn from one or more batteries (i.e., an electric motor) and there are drive systems that use an electric motor in combination with an internal combustion engine to propel the vehicle, which is typically called a hybrid vehicle.

Drive systems are available in addition to electrical propulsion and electrical propulsion in combination with another propulsion system (e.g., an internal combustion engine). Utilization of electrical propulsion, either individually or in combination with other propulsion systems for vehicle propulsion and use of battery power for other vehicle systems advantageously includes thermal management of the one or more batteries used forming the electrical power source.

Currently, thermally managed battery systems for vehicle batteries include, but are not limited to a coolant between a battery-internal heat exchanger and a vehicle thermal system. At least two problems exist with this current arrangement. First, the battery-internal heat exchanger is a complicated assembly due to the complex shape and high number of battery cells, high tolerances, cell surface finishes, manifold surface finish, and the high number of seals. Secondly, the vehicle thermal system is also complicated and has numerous components. For example, current vehicle thermal systems include multiple heat transfer loops with passive radiator cooling and active compressor cooling loops, a resistive heater, pumps, condensers, radiators, expansion valves, 3-way valves, and the control hardware and/or software for the many components. Alternatives to this complicated vehicle thermal system with numerous parts and alternatives to the battery-internal heat exchanger with complicated assemblies, complex shapes, high tolerances, surface finishes, and a large number of seals are continually sought to thermally manage vehicle battery systems for use in electric or hybrid vehicles or use in systems of other vehicles configurations.

One thermally managed battery system has been introduced that uses thermoelectric semiconductor units operating in accordance with the Peltier effect (i.e., a Peltier device). The thermoelectric semiconductor units in this prior system are externally located from battery tray, which holds the multiple battery cells forming a battery pack, in an exhaust port. This prior art system has a number of limitations, including, but not limited to, the inability to heat or cool individual battery cells and a reduced cooling and/or heating efficiency with the heating and/or cooling source (e.g., thermoelectric semiconductor units) removed from a close proximity to the battery cells.

In view of the foregoing, it is desirable to provide the ability to heat and/or cool individually batteries of a battery pack and also desirable to improve the heating and/or cooling efficiency. In addition, it is desirable to reduce the complexity of battery-internal heat exchangers and reduced the complexity of vehicle thermal systems. Furthermore, it is desirable to improve such characteristics as volume, weight, reliability and cost. Moreover, other desirable features and characteristics will become apparent from the subsequent summary and detailed description, and the appended claims, taken in conjunction with the accompanying drawings and this background.

SUMMARY

A battery back for a vehicle is provided that includes, but is not limited to a first battery cell, a first thermoelectric semiconductor device, which in this example is a Peltier device coupled to the first battery cell, and a heat exchanger coupled to the first thermoelectric semiconductor device. The battery pack can also include a second battery cell and a second thermoelectric semiconductor device coupled to the second battery cell and coupled to the heat exchanger. The second thermoelectric semiconductor device can be interposed between the first battery cell and the second battery cell and the first thermoelectric semiconductor device is preferably adapted to control a first temperature of the first battery cell and the second thermoelectric semiconductor device is preferable adapted to control a second temperature of the second battery cell in a manner that is substantially independent of the control of the first temperature of the first battery cell by the first thermoelectric semiconductor device. The battery pack can further include N battery cells in addition to the first battery cell and the second battery cell and N thermoelectric semiconductor devices coupled to the N battery cells, wherein N is an integer greater than zero. The N thermoelectric semiconductor devices can be coupled to the N battery cells and interposed between two adjacent battery cells of the N battery cells.

The battery pack is available for use in an automobile and the first battery cell is available for power to be drawn by an electric motor, and the electric motor can be configured to individually propel the vehicle or propel the vehicle in combination with an internal combustion engine. Alternatively, the battery pack can also be used for Fuel Cell Electric Vehicles (FCEVs) and the battery pack is also available for use in powering an air conditioning unit, electrical heaters, pumps, and/or fans.

The first thermoelectric semiconductor device includes, but is not limited to a first ceramic plate coupled to the first battery cell, a second ceramic plate coupled to the heat exchanger, an N-conductor interposed between the first ceramic plate and the second ceramic plate, and a P-conductor interposed between the first ceramic plate and the second ceramic plate, and in an alternate embodiment, the first thermoelectric semiconductor device can include a heat conduction fin coupled to the first battery cell.

A battery pack for a vehicle is also provided that includes means for storing energy, means for producing a Peltier effect coupled to the means for storing energy, and means for transferring thermal energy coupled to the means for producing the Peltier effect. This battery pack can also have N means for storing energy in addition to the means for storing energy and N thermoelectric semiconductor devices coupled to the N means for storing energy, wherein N is an integer greater than zero. In one embodiment, the N thermoelectric semiconductor devices are coupled to the N means for storing energy and interposed between two adjacent means for storing energy of the N means for storing energy. The N means for storing energy can be coupled to any number of devices and vehicle system, including an electric motor that is powered by electricity drawn from the N means for storing energy to propel the vehicle and also propel the vehicle in combination with an internal combustion engine.

A battery system for a vehicle is also provided that includes, but is not limited to a heat transfer loop, a first battery cell, a first thermoelectric semiconductor device coupled to the first battery cell and the heat transfer loop, a variable voltage source coupled to the first thermoelectric semiconductor device, a first temperature sensor coupled to the first battery cell, and a controller coupled to the variable voltage source and the first temperature sensor. The controller configured to receive a signal indicative of a first temperature of the first battery cell from the first temperature sensor and adjust a first voltage of the variable voltage source applied to the first thermoelectric semiconductor device based at least in part on an evaluation of the first temperature. This battery system can also have a second battery cell, a second thermoelectric semiconductor device coupled to the second battery cell and the heat transfer loop, a second variable voltage source coupled to the second thermoelectric semiconductor device, and a second temperature sensor coupled to the second battery cell. The controller is coupled to the second variable voltage source and the second temperature sensor and configured to receive a second signal indicative of a second temperature of the second battery cell from the second temperature sensor and adjust a second voltage of the second variable voltage source applied to the second thermoelectric semiconductor device based at least in part on a second evaluation of the second temperature.

BRIEF DESCRIPTION OF THE DRAWINGS

The embodiments will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
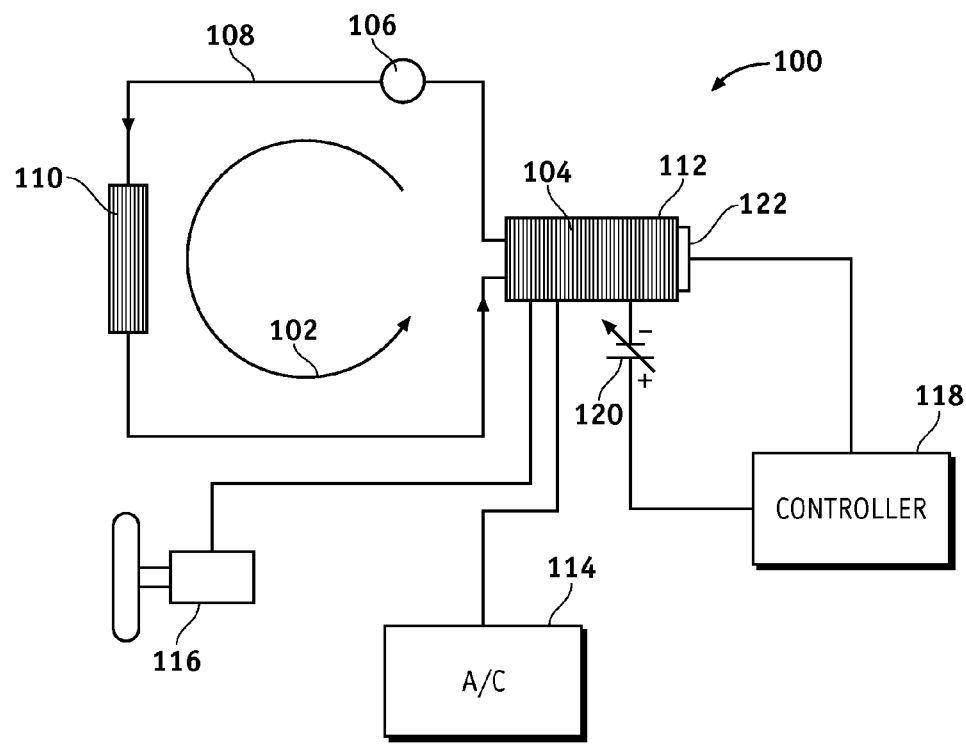
FIG. 1 illustrates a battery system in accordance with a first embodiment.

FIG. 1 illustrates a battery system 100 in accordance with a first embodiment. The battery system 100, includes, but is not limited to a heat transfer loop 102, which is preferably a single heat transfer loop as shown, and a battery pack 104. The heat transfer loop 102 has a pump 106 that forces a heat transfer fluid (e.g., a heat transfer liquid or gas, including air, which flow through the heat transfer loop 102 to transfer heat to devices that dissipate and/or utilize such heat) that is preferably contained within a structure, such as a coolant duct. The pump 106 can have any number of configurations, including a fan that moves the heat transfer fluid from the battery pack 104 to a radiator 110.

The battery pack 104, which is preferably contained in a battery housing 112 or battery tray, generates heat during charging and discharging cycles as the battery pack 104 provides charges and discharges electricity for use by the systems of the vehicle (not shown). For example, the battery pack can power an air conditioning unit 114 (or electrical heaters, pumps, and/or fans.) and/or an electric motor 116 (or air conditioning unit, electrical heaters, pumps, and/or fans) that is powered by electricity drawn from the battery pack 104 to propel the vehicle either individually or in combination with another propulsion systems (e.g., an internal combustion engine) for a hybrid vehicle or for a Fuel Cell Electric Vehicle (FCEV). The vehicle can be any number of land (e.g., an automobile), water, air, or space vehicles that utilize battery energy for operation of vehicle functions, including, but not limited to hybrid vehicles.

Thermal control of the battery during use by the one or more vehicle functions is conducted with a controller 118 that is coupled to at least one variable voltage source 120 and at least one temperature sensor 122. The controller 118, which can have any number of hardware, software, and/or firmware configurations, is configured to receive a signal from the temperature sensor 122 that is indicative of a temperature of the battery pack 104 as a whole or an individual battery cell or battery cells of the battery pack 104. The controller 118 is further configured to adjust a voltage of the variable voltage source 120 that is applied to a thermoelectric semiconductor device, which results in a heating or cooling of a battery cell or battery cells, based at least in part on an evaluation of the temperature by the controller 118.

Figure 2:
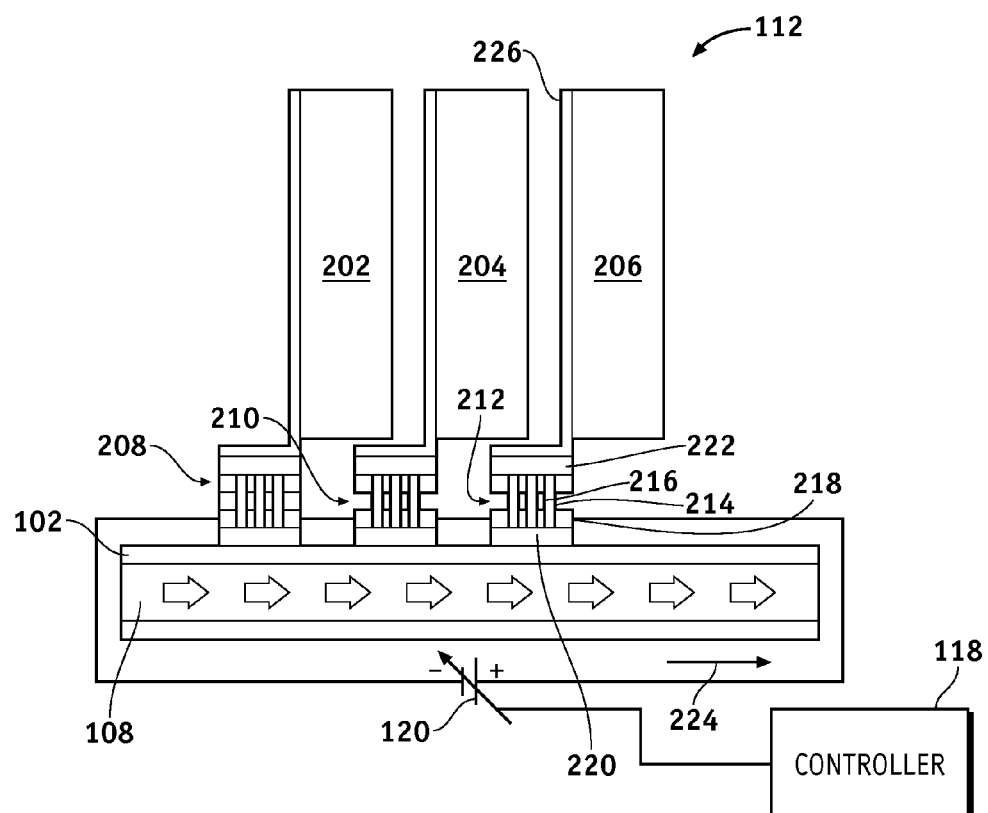
FIG. 2 illustrates the battery pack shown in FIG. 1 in accordance with a first embodiment.

Referring to FIG. 2, the battery pack 104 of FIG. 1 is illustrated in accordance with a first embodiment. The battery pack 104 receives the voltage from the variable voltage source 120, under the control of the controller 118, resulting in a heating or cooling of at least one of the battery cells 202,204,206 and preferably substantially all or all of the battery cells 202,204,206. In addition, N additional cells, where N is an integer greater than one, which are not shown in FIG. 1, can form be used to form the battery pack 104, and at least one of the battery cells 202,204,206 and preferably substantially all or all of the battery cells of the battery pack 104 are coupled to a thermoelectric semiconductor device 208,210,212 and the heat transfer loop 102 having the heat transfer fluid 108. Moreover, in accordance with an embodiment, N thermoelectric semiconductor devices are provided in addition to the thermoelectric semiconductor devices 208, 210,212 and associated with the N additional cells.

In this example, the thermoelectric semiconductor devices 208,210,212, which are configured to operate in accordance with the Peltier effect (i.e., a Peltier devices) and generally referred to as Peltier devices, are coupled to the battery cells 202,204,206 and formed of at least one N-type semiconductor 214 connected in series with a P-type semiconductor 216. The thermoelectric semiconductor devices 208,210,212 are shown in FIG. 1 with three N-type semiconductor and P-type semiconductor series pairs, but additional series pairs can be included in one or more the thermoelectric semiconductor devices 208,210,212 or other such devices that are not presented in this exemplary embodiment.

The N-type semiconductor 214 and the P-type semiconductor 216 are separated by metal bridges 218 and interposed between ceramic plates 220,222. When a direct current (DC) voltage is applied across the N-type semiconductor 214 and the P-type semiconductor 216, electrons are forced from the P-type semiconductor 216 to the N-type semiconductor 214. As the electrons need energy to move into the N-type semiconductor 214, this energy is received as thermal energy and the heat absorption is proportional to the applied current 224. Accordingly, thermal energy is removed or applied to the battery cells 202,204,206 based upon the polarity and magnitude of the voltage presented by the variable voltage source 120 to the N-type semiconductor 214 and the P-type semiconductor 216.

Continuing with reference to one of the battery cells 202,204,206 (i.e., battery cell 206) and one of the thermoelectric semiconductor devices 208,210,212 (i.e., thermoelectric semiconductor device 212) for the sake of simplicity and clarity, the thermal energy removed or applied to the battery cell 206 is conducted by an element of the thermoelectric semiconductor device 212 in the form of a thermal conduction fin 226 coupled to the ceramic plate 222 and a surface of the battery cell 206. In an example of cooling the battery cell 206, a positive voltage applied to the thermoelectric semiconductor device 212 results in a cooling of the thermal conduction fin 226 and the battery cell 206, and the ceramic plate 220 coupled to the heat transfer loop 102 is heated and the heat is removed by the heat transfer fluid 108 for cooling by the radiator 110 (See FIG. 1). Conversely, in an example of heating the battery cell 206, a negative voltage applied to the thermoelectric semiconductor device 212 results in a heating of the thermal conduction fin 226 and the ceramic plate 220 that is coupled to the heat transfer loop 102, and heat is added to the battery cell 206 and removed from the heat transfer fluid 108. Alternate configurations and arrangements exist for the thermoelectric semiconductor devices 208,210,212 and the relationship of these devices with respect to the battery cells 202,204,206.

Figure 3:
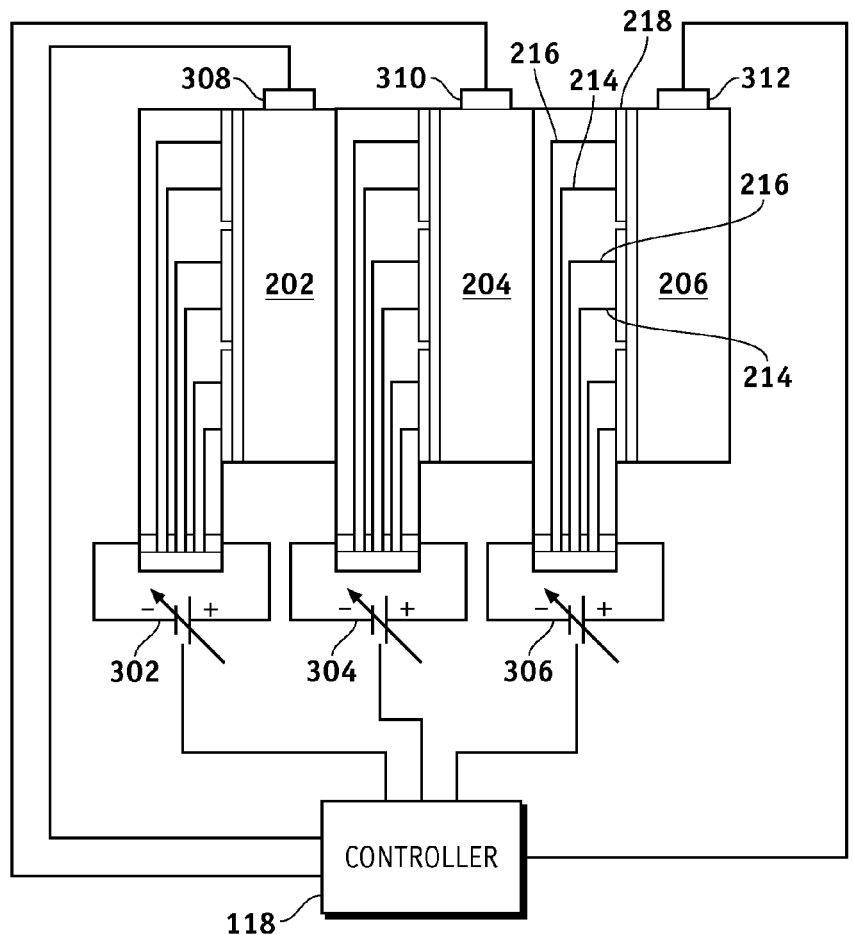
FIG. 3 illustrates the battery pack shown in FIG. 1 in accordance with a second embodiment.

Referring to FIG. 3, such an alternate configuration and arrangement is illustrated for the battery pack 104 of FIG. 1 in accordance with a second embodiment. At least one of the thermoelectric semiconductor devices (e.g., thermoelectric semiconductor device 210 or thermoelectric semiconductor device 212) is interposed between two of the battery cells (e.g., battery cell 204 and battery cell 206). Due to this L-shape of the thermoelectric semiconductor devices 208, 210,212, the thermal conduction fin 226 used in the embodiment shown in FIG. 1 is no longer necessary. The ceramic plates 220,222 of the thermoelectric semiconductor devices 208,210,212 are positioned in a substantially perpendicular relationship with respect to the each other. One of the ceramic plates (e.g., ceramic plate 220) is placed in contact with the heat transfer loop 102 as shown in FIG. 2, and the other ceramic plate (e.g., ceramic plate 222) is placed in contact with the battery cell 206. This configuration and arrangement of the thermoelectric semiconductor devices 208,210,212 with respect to the battery cells 202,204,206 provides for an improved distribution of heating and cooling as the heat does not have to be conducted through the thermal conduction fin. Additional improvements are also available with this configuration and arrangement as shown in FIG. 2, and improvements are also available with the configuration and arrangement of the battery system 100 as shown in FIG. 1.

For example, and with continuing reference to FIG. 3, variable voltage sources 302,304,306 and temperature sensors 308,310,312 can be associated with each of the battery cells 202,204,206 and thermoelectric semiconductor devices 208,210,212. The controller 118 is configured to receive a signal from each of the temperature sensors 308,310,312 that is indicative of a temperature of the individual battery cells 202,204,206. The controller 118 is further configured to individually adjust the voltage of the variable voltage sources 302,304,306 that is individually applied to the thermoelectric semiconductor device 208,21,0,212, which results in the capability of individually heating or cooling the battery cells 202,204,206, based at least in part on evaluations of the temperatures by the controller 118. The individual thermoelectric semiconductor devices 208,210,212 associated with each of the battery cells 202,204,206 provides significant flexibility, simplicity, and efficiency in the battery pack 104, and can also be used to improve other components of the battery system as a whole.

Figure 4:
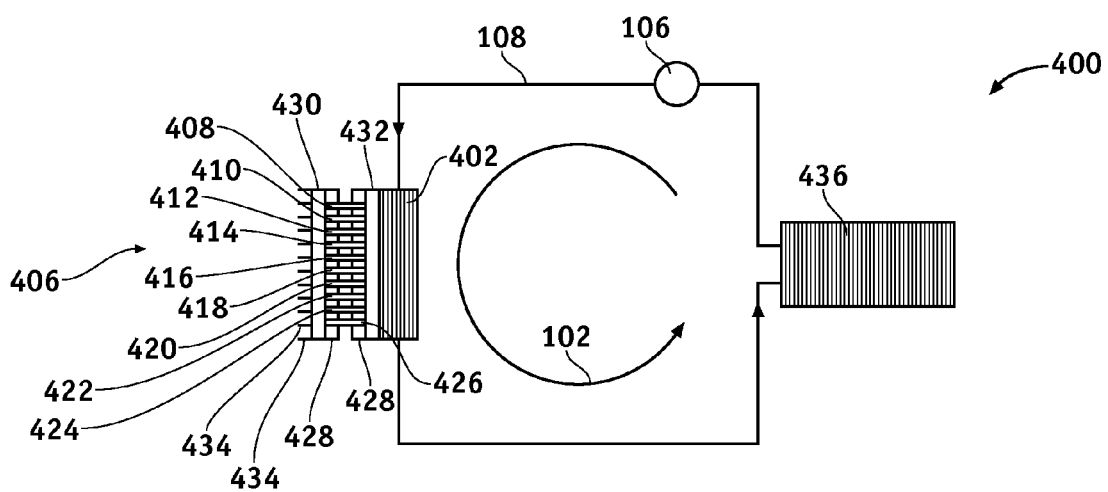
FIG. 4 illustrates a battery system in accordance with a second embodiment.

For example, and with reference to FIG. 4, a battery system 400 is shown in accordance with a second embodiment. The battery system 400 includes, but is not limited to the heat transfer loop 102, which is preferably a single heat transfer loop as previously described in this detailed description. In addition, the battery system 400 includes a pump 106, and heat transfer fluid 108 as previously described, but the radiator 110 as shown in FIG. 1 is replaced with a thermal exchange plate 402. The thermal exchange plate 402 is coupled to a thermoelectric semiconductor device 406.

In this embodiment of the battery system 400, the thermal exchange plate 402 has ten (10) N-type and P-type semiconductor pairs 408,410,412,414,416,418,420,422,424,426. However, fewer or greater number of N-type and P-type semiconductor pairs can be utilized in accordance with this embodiment. The N-type and P-type semiconductor pairs 408,410,412,414,416,418,420,422,424,426 are separated by metal bridges 428 and interposed between ceramic plates 430,432 that transfers thermal energy (i.e., heating and/or cooling) between the heat transfer fluid 108 and the ceramic plate 432 that is coupled to the thermal exchange plate 402. The other ceramic plate 430 is placed in a heating/cooling environment, such as an ambient air flow, and also provided with heat sinks 434 to facilitate the absorption or dissipation of the thermal energy.

In this configuration, application of a voltage to the thermoelectric semiconductor device 406 provides a cooling of the heat transfer fluid 108 within the heat transfer loop 102 and heating of the ambient air and results in the removal of heat from the heat transfer fluid 108 and cooling of the battery pack 436, which can have a configuration as described with reference to the battery pack 104 of FIG. 1 or have a configuration that does not include the thermoelectric semiconductor devices, sensors, and or variable voltage sources as previously described with reference to FIG. 1 to FIG. 3. Conversely, application of a opposite polarity voltage to the thermoelectric semiconductor device 406 provides a heating of the heat transfer fluid within the single heat transfer loop and cooling of the ambient air, ultimately resulting in the addition of head to the heat transfer fluid 108 and heating of the battery pack 436. Therefore, the thermoelectric semiconductor device 406 can provide the thermal control of the battery pack 436 if the battery pack 436 does not have one or more semiconductor devices or the thermoelectric semiconductor device 406 can supplement the thermal control of the battery pack 436 if the battery pack 436 has one or more semiconductor devices providing thermal regulation within the housing.

While at least one exemplary embodiment has been presented in the foregoing summary and detailed description, it should be appreciated that a vast number of variations exist. For example, in accordance with one exemplary embodiment, the thermoelectric semiconductor device or devices can be used to generate electrical energy when there is a temperature difference between the batter and ambient air as the Peltier effect would operate in reverse as previously described in this detailed description. In this manner, the temperature difference is used to generate electrical energy rather then using electrical energy to generate a temperature difference between the ambient air and the battery.

It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A battery pack for a vehicle, comprising:
   means for storing energy;
   means for producing a Peltier effect using an L-shaped thermal conduction fin that includes a first portion that is directly coupled to the means for storing energy and a second portion that is perpendicular to the first portion and that is directly coupled to the means for producing the Peltier effect; and
   means for transferring thermal energy coupled to the means for producing the Peltier effect.

2. The battery pack according to claim 1, further comprising:
   N means for storing energy in addition to the means for storing energy; and
   N thermoelectric semiconductor devices coupled to the N means for storing energy,
   wherein N is an integer greater than zero.

3. The battery pack according to claim 2, wherein the N thermoelectric semiconductor devices are coupled to the N means for storing energy and interposed between two adjacent means for storing energy of the N means for storing energy.

4. The battery pack according to claim 3, wherein the N means for storing energy are coupled to an electric motor that is powered by electricity drawn from the N means for storing energy to propel the vehicle.

5. The battery pack according to claim 3, wherein the N means for storing energy are coupled to an electric motor that is powered by electricity drawn from the N means for storing energy to propel the vehicle in combination with an internal combustion engine.

6. A battery pack for a vehicle, comprising:
   a first battery cell;
   a first thermoelectric semiconductor device having an L-shaped thermal conduction fin that includes a first portion that is directly coupled to the first battery cell and a second portion that is perpendicular to the first portion and that is directly coupled to the thermoelectric semiconductor device; and
   a heat exchanger coupled to the first thermoelectric semiconductor device.

7. The battery pack according to claim 6, further comprising:
   a second battery cell; and
   a second thermoelectric semiconductor device having a thermal conduction fin that is directly coupled to the second battery cell and wherein the second thermoelectric semiconductor device is coupled to the heat exchanger.

8. The battery pack according to claim 7, wherein the thermal conduction fin of the second thermoelectric semiconductor device is interposed between the first battery cell and the second battery cell.

9. The battery pack according to claim 7, wherein the first thermoelectric semiconductor device is adapted to control a first temperature of the first battery cell and the second thermoelectric semiconductor device is adapted to control a second temperature of the second battery cell in a manner that is substantially independent of the control of the first temperature of the first battery cell by the first thermoelectric semiconductor device.

10. The battery pack according to claim 7, further comprising:
    N battery cells in addition to the first battery cell and the second battery cell; and
    N thermoelectric semiconductor devices coupled to the N battery cells,
    wherein N is an integer greater than zero.

11. The battery pack according to claim 10, wherein the N thermoelectric semiconductor devices are coupled to the N battery cells and interposed between two adjacent battery cells of the N battery cells.

12. The battery pack according to claim 6, wherein the vehicle is an automobile.

13. The battery pack according to claim 6, wherein the first battery cell is coupled to an electric motor that is powered by electricity drawn from the first battery cell.

14. The battery pack according to claim 6, wherein the first battery cell is coupled to an electric motor that is powered by electricity drawn from the first battery cell to propel the vehicle in combination with an internal combustion engine.

15. The battery pack according to claim 6, wherein the first battery cell is coupled to an air conditioning unit that is powered by electricity drawn from the first battery cell.

16. The battery pack according to claim 6, wherein the first thermoelectric semiconductor device is a Peltier device.

17. The battery pack according to claim 6, the first thermoelectric semiconductor device comprising:
    a first ceramic plate coupled to the second portion of the thermal conduction fin;
    a second ceramic plate coupled to the heat exchanger;
    an N-conductor interposed between the first ceramic plate and the second ceramic plate; and
    a P-conductor interposed between the first ceramic plate and the second ceramic plate.

18. A battery system for a vehicle, comprising:
    a heat transfer loop;
    a first battery cell;
    a first thermoelectric semiconductor device coupled to the heat transfer loop and having an L-shaped thermal conduction fin that includes a first portion that is directly coupled to the first battery and a second portion that is directly coupled to the first thermoelectric semiconductor device;
    a variable voltage source coupled to the first thermoelectric semiconductor device; and
    a first temperature sensor coupled to the first battery cell; and
    a controller coupled to the variable voltage source and the first temperature sensor, said controller configured to:
    receive a signal indicative of a first temperature of the first battery cell from the first temperature sensor; and
    adjust a first voltage of the variable voltage source applied to the first thermoelectric semiconductor device based at least in part on an evaluation of the first temperature.

19. The battery system of claim 18, further comprising:
    a second battery cell;
    a second thermoelectric semiconductor device coupled to the heat transfer loop and having a thermal conduction fin that is coupled to the second battery cell;
    a second variable voltage source coupled to the second thermoelectric semiconductor device; and
    a second temperature sensor coupled to the second battery cell, wherein the controller is coupled to the second variable voltage source and the second temperature sensor, said controller configured to:
receive a second signal indicative of a second temperature of the second battery cell from the second temperature sensor; and
adjust a second voltage of the second variable voltage source applied to the second thermoelectric semiconductor device based at least in part on a second evaluation of the second temperature.

* * * * *